United States Patent [19]

Sakaguchi et al.

[11] Patent Number: 5,781,663
[45] Date of Patent: Jul. 14, 1998

[54] SYSTEM FOR RECOGNIZING VARIOUS INPUT DATA TYPES

[75] Inventors: Katsuhiko Sakaguchi, Kawasaki; Tsunekazu Arai, Tama; Eiji Takasu, Yokohama; Hiroto Yoshii, Tokyo, all of Japan

[73] Assignee: Canon Kabushiki Kaisha, Tokyo, Japan

[21] Appl. No.: 495,102

[22] Filed: Jun. 27, 1995

[30] Foreign Application Priority Data

Jun. 30, 1994 [JP] Japan ................................. 6-149422

[51] Int. Cl.⁶ ................ G06K 9/00; G06K 9/18; G06K 9/62; G06K 9/74
[52] U.S. Cl. .................... 382/189; 382/186; 382/187; 382/228
[58] Field of Search .................... 382/181, 182, 382/184, 185, 186, 187, 189, 228; 235/462; 395/12; 345/173

[56] References Cited

U.S. PATENT DOCUMENTS

| | | | |
|---|---|---|---|
| 4,680,804 | 7/1987 | Kuzunuki et al. | 382/187 |
| 4,764,972 | 8/1988 | Yoshida et al. | 382/187 |
| 4,878,249 | 10/1989 | Mifune et al. | 382/187 |
| 5,022,081 | 6/1991 | Hirose et al. | 381/43 |
| 5,150,424 | 9/1992 | Aguro et al. | 382/189 |
| 5,410,612 | 4/1995 | Arai et al. | 382/13 |
| 5,448,475 | 9/1995 | Senoo et al. | 382/187 |
| 5,502,774 | 3/1996 | Bellegarda et al. | 382/187 |
| 5,566,248 | 10/1996 | Ulrich | 382/187 |
| 5,583,543 | 12/1996 | Takahashi et al. | 382/189 |
| 5,592,566 | 1/1997 | Pagallo et al. | 382/187 |

FOREIGN PATENT DOCUMENTS 0431843   6/1991   European Pat. Off. .

OTHER PUBLICATIONS

"A Multifront Word Recognition System For Postal Address Reading", J. Schurmann, IEEE Transactions On Computers, vol. C–27, No. 8, Aug. 1978, pp. 721–732.

*Primary Examiner*—Bipin Shalwala
*Attorney, Agent, or Firm*—Fitzpatrick, Cella, Harper & Scinto

[57] ABSTRACT

An image recognition apparatus recognizes an input locus as a command, a figure and a character, respectively in gesture recognition mode, figure recognition mode and character recognition mode. Regarding each recognized result, similarity between the input image and the recognized shape is obtained. The similarities are compared with each other, and if the difference between the similarities is less than a predetermined value, the recognized results are displayed for selection by an operator. Then, selected one of the displayed shapes is determined as the final recognition result. This enables correct locus input even if there is a possibility that the locus is recognized, in different recognition modes, as similar shapes of different functions.

50 Claims, 10 Drawing Sheets

SYSTEM FOR RECOGNIZING VARIOUS INPUT DATA TYPES

BACKGROUND OF THE INVENTION

Present invention relates to a data input apparatus for inputting operation commands, character data and other type of data, using an input pen and a digitizer, and a data input method for the apparatus.

[Related Art]

Conventional pen-input electronic devices usually have gesture-command input function that allows a user to pen-input operation commands in character-input mode or locus-input mode.

In gesture-command input, if a predetermined input locus is recognized, the command corresponding to the input locus operates. To discriminate an input locus from simply-inputted locus data, or to avoid confusion of gesture-command recognition with character and figure recognition, several limitations are introduced as follows.

In character-input mode, an input locus hard to distinguish from a similar character cannot be used as a gesture command, otherwise, a character similar to an input locus used as a gesture command cannot be recognized. Also, in figure-input mode, shapes often used as figures such as 0, X, and Δ cannot be used as gesture commands. Further, there is a case where the user needs to designate command-input mode or noncommand-input mode.

As described above, these limitations are made basically to prevent confusion of gesture-command input with other-type of input in the same input mode.

However, in the case where the user designates the input mode, the user may need to change input modes so often that the input operation is not smooth, meaning, the manual mode-change operation will be troublesome.

As mentioned above, if the pen-input device does not have command-input mode, the input loci used as gesture commands, otherwise shapes recognizable as characters or figures are limited. For this reason, the user cannot use, e.g., shapes which are intuitively recognizable by the user, as gesture commands. Further, as input characters are limited, some characters cannot be easily inputted. Furthermore, it is confusing for the user when a command is inputted with different gestures in respective figure-input mode and character input mode.

For example, a gesture command "X" (delete) is effective when character-input is not made, however, in character-input mode, the input "X" is treated as an alphabet. When a gesture command "γ" (undo) exists, a Greek letter "γ" cannot be inputted.

In this manner, the conventional input systems have different gestures in different input modes regarding one input intention, and this is confusing to users.

SUMMARY OF THE INVENTION

The present invention has been made in consideration of the above situation, and has as its first object to provide an image recognition apparatus and method which distinguishes the purposes of locus-inputs, and recognizes input loci which are similar but of different mode types, without confusing.

It is a second object of the present invention to provide a data input apparatus and method which enables pen-input with intuitive and user-recognizable images, each reflects user's intention exactly.

According to the present invention, the above objects are attained by providing an image recognition apparatus comprising: recognition means having a plurality of recognition modes such as figure recognition mode for recognizing an input image as a figure code, character recognition mode for recognizing the input image as a character code, gesture recognition mode for recognizing the input image as a command; recognition determination means for determining one of the recognition mode as available recognition mode; similarity judgment means for judging whether the image recognizable in one of the plurality of recognition modes is also recognizable in another one of the plurality of recognition modes; and selection image display means for, if the image recognizable in a plurality of recognition modes, displaying candidate code(s) for a recognition(s) result, for the user's selection. This construction achieves exact recognition of input intended by the user, when the input image of figure, a character or command is recognizable by a plurality of recognition means.

Note that the similarity judgment means performs similarity judgment based on input judgment reference value.

As described above, in a case where a plurality of recognition modes are activated simultaneously, even if there are similar shapes which are often used in the respective modes, or even if recognition processing of, input locus cannot be easily discriminated, the image recognition apparatus and method can perform recognition in accordance to the user's intention.

The present invention is advantageous since the user can clearly designate recognition processing to an input locus, further, the above-mentioned limitations on gestures, characters and the like are removed. This avoids confusing input operation and eliminates time-wasting storing of gestures in different modes used as the same command.

Further, it is not necessary for the recognition system designer to consider the limitations on shapes of input loci. This allows the recognition system designer to use any shape.

Furthermore, in command-input, more intuitive and user-recognizable commands can be used.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

[First Embodiment]

Figure 1:
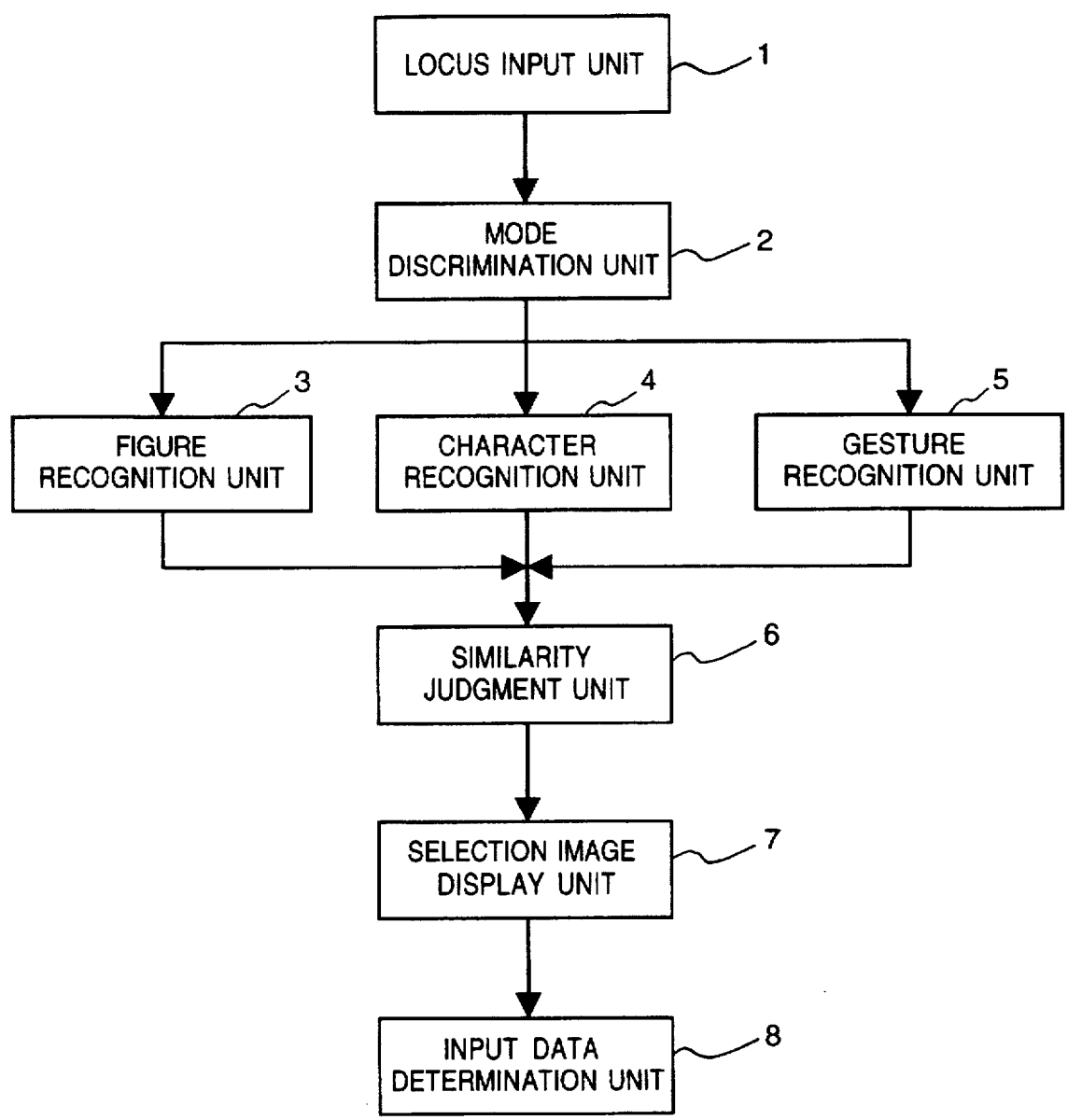
FIG. 1 is a block diagram showing the construction of an input apparatus according to a first embodiment of the present invention.

FIG. 1 shows the construction of an input apparatus such as a pen computer, according to a first embodiment of the present invention. This construction operates to send pen-inputted data to the next process step executed by, e.g., an application program.

FIG. shows a data system comprising the data input apparatus 1001 which has the construction in FIG. 1 and a data processing apparatus 1002. In FIG. , the data processing apparatus 02 inputs data from an data input apparatus 1001.

In FIG. 1, a locus input unit 1 performs locus-input processing to send locus data, inputted from a digitizer with an input-pen, in recognizable unit, to the subsequent processing. A mode discrimination unit 2 sends the input locus data to any of recognition units 3 to 5, in accordance with available recognition mode such as character-recognition mode, figure-recognition mode, command-recognition mode etc. If a plurality of recognition modes are available, the mode discrimination unit 2 sends the input locus data to plural recognition units. The available modes are set prior to locus input by a user of the input apparatus, i.e., an application according to sorts of data which are used by the user. The recognition units 3 to 5 respectively confirm the shape of input locus and obtain a corresponding code. The figure recognition unit 3 determines a predetermined figure similar to received locus data (image), and a figure code indicative of the kind of figure and similarity data representing the similarity between the predetermined figure and the input locus data by percentage, to the next processing. The character recognition unit 4 sends a character code recognized from received locus data and similarity data to the next processing. Similarly, the gesture recognition unit 5 sends a gesture code indicative of the type of command and similarity data to the next processing. The recognition algorithm and similarity calculation method used in the recognition units 3 to 5 may be prior art methods used in computers as well-known techniques. For example, an input locus is analyzed into line segments, and phase-structure features of, e.g., a loop, a dot, concavity and convexity are extracted, and the extracted features are compared with features of characters or figures. The similarities are given in accordance with the number of coincident features. A similarity judgment unit 6 compares the similarity sent from the plurality of recognition units. That is, regarding one image, the similarity judgment unit 6 determines whether or not the image is a polychrestic image, from which a unique code cannot be recognized in one recognition mode but a plurality of codes in respective plural recognition modes can be recognized. When the similarity judgment unit determines the input image is a polychrestic image, selection image display unit 7 displays the selection images for a user to designate a recognition mode. An input data determination unit 8 outputs data finally determined as the result from recognition or user's selection to the data processing apparatus 1002.

Figure 2A:
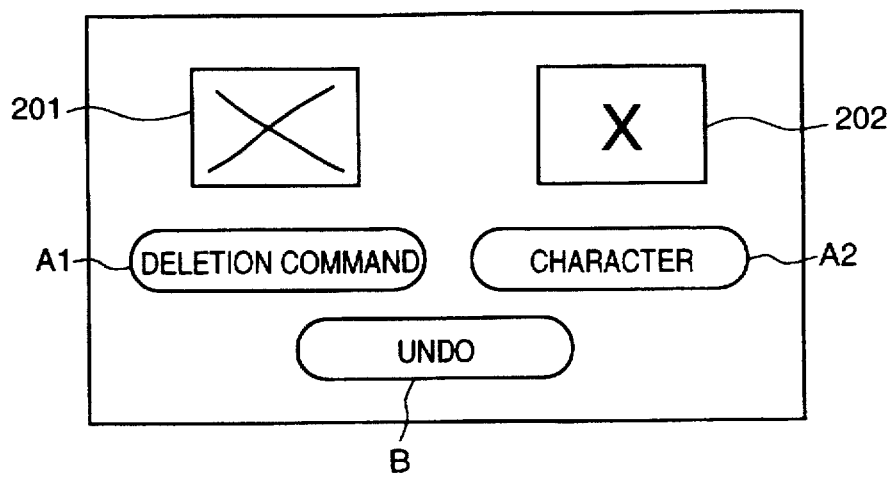
FIGS. 2A and 2B are selection image examples in the first embodiment.
Figure 2B:
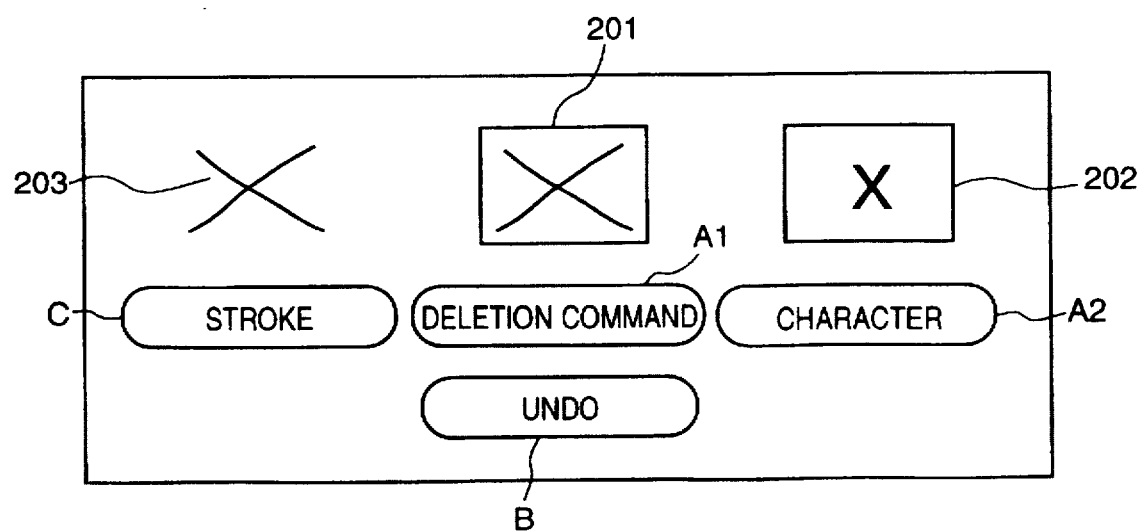

FIGS. 2A and 2B show examples of the selection image displayed by the selection image display unit 7. In FIG. 2A, the display has a window 201 displaying a shape "X" with a selection button A1 indicating "deletion command", and a window 202 displaying an alphabet "X" with a selection button A2 indicating "character". The user sees the selection image and knows that the data input apparatus 1001 cannot recognize the input, then selects the appropriate selection buttons A1 or A2 with the input pen. If the user did not intend command input and character input and wants to cancel the input itself, the user presses an undo button B. Then, the input locus data is deleted and the-process returns to the state before the deleted data was inputted. Also, a recognition result can be canceled. As shown in FIG. 2B, the selection image has a selection button C indicating "stroke". If the user presses this button, only the result from the recognition of the input locus data is deleted, and the locus data remains in a window 203. For example, in use of graphic application, the user may simply input strokes. As the recognition processing is not desired, the user presses the stroke selection button C to delete only the recognition result, and the input data determination unit 8 outputs the input strokes to the next processing or the data processing apparatus 1002.

Next, the processing in this example where the X-shaped locus is inputted with the input-pen and selection images in FIGS. 2A and 2B are outputted, i.e., a case where character-recognition mode and gesture-recognition mode are available will be described with reference to the flowchart of FIG. 3.

Figure 3:
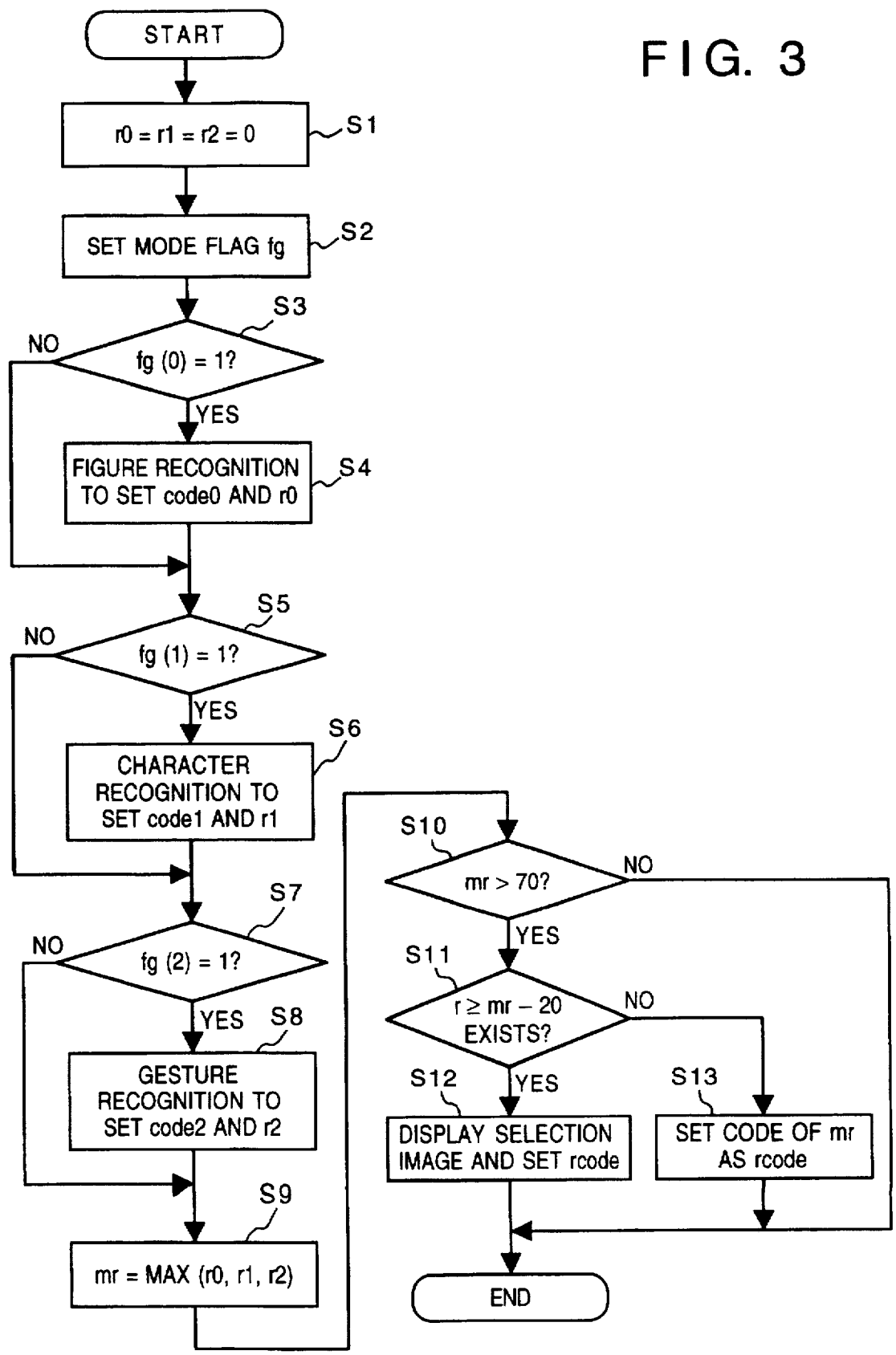
FIG. 3 is a flowchart showing the operation of the first embodiment.

FIG. 3 shows the processing that starts when input loci are accumulated to a predetermined amount in the locus input unit 1, and performs respective processing by the blocks 2 to 7 in FIG. 1. The locus input unit 1 divides the input locus data with stroke units, as one stroke being an interval between a contact time where the input pen touches an input surface and a pen-up time where the input pen is picked up from the input surface. When a predetermined time has elapsed since the stroke input started, the locus input unit 1 regards the strokes inputted by that time as one set of symbol-structure data, and sends the set of data to the next processing. This locus-data dividing may be performed by "character cut-out" processing in handwritten character recognition, where input strokes are divided into a single character. Various well-known techniques are available as character cut-out processing.

Figure 9:
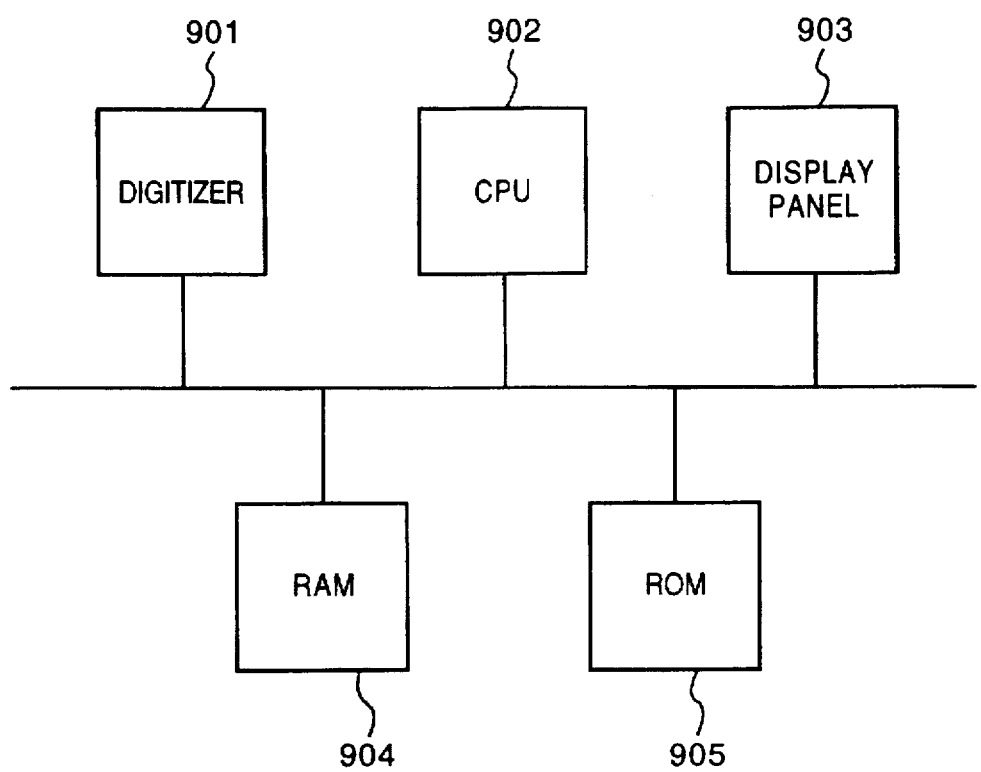
FIG. 9 is a block diagram showing the input apparatus according to the third embodiment.
Figure 10:
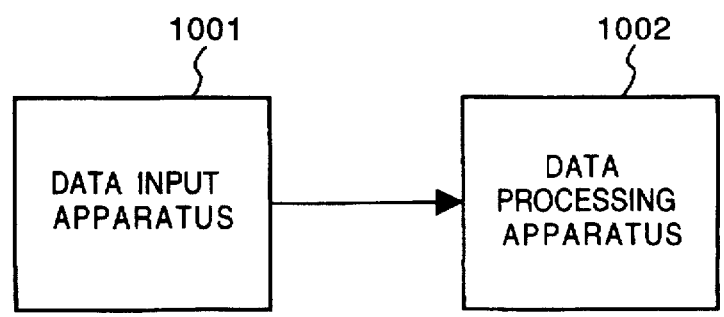
FIG. 10 is a block diagram showing the construction of a data processing apparatus using the data input apparatus of the embodiments.

FIG. 9 also shows the construction of the data input apparatus 1001 shown in FIG. 10. In FIG. 9, locus data hand-written from a digitizer 901 is displayed on a display panel 903, and subjected to recognition processing by a CPU 902, as a character, a figure or a command. The CPU 902 performs necessary processing by executing a program stored in a RAM 904 or a ROM 905. The processings by the respective units in FIG. 1 are realized by the execution of programs by the CPU 902. Note that in FIG. 9, in a case where the digitizer 901 comprises a transparent member, the digitizer 901 is overlaid on the display panel 903 so that the display panel 903 displays a locus as if it traces input from the digitizer. This attains more natural handwritten input.

In FIG. 3, when a locus is inputted by the locus input unit 1, storage areas r0 to r2 for storing similarity data are cleared to "0" in step S1. Next, in step S2, the mode discrimination unit 2 checks available recognition mode(s) in the current application program, and sets a value "1" to a mode flag fg of the available recognition mode. The flag values are fg(0), fg(1) and fg(2), respectively for figure recognition, character recognition and gesture recognition. In this embodiment, these flags are prepared in accordance with recognition processings by the application program. To perform recognition of pen input in use of application program or utility program, recognition processings can be determined in designing of the program, and set in advance as this embodiment. For example, when an application which functions as a note pad is triggered, the application accepts only character input and gesture input, accordingly, the application sets the necessary recognition modes to a memory area. The flags fg(0) to fg(2) are set corresponding to the stored contents. In a case where a selection image is displayed, as shown in FIGS. 2A and 2B, as character recognition and gesture recognition are available, the flags fg(1) and fg(2) are set to "1".

The process proceeds to step S3 to S8, in which the respective flags fg(0) to fg(2) are checked and recognition processing corresponding to a set flag value is executed to the set of strokes sent from the locus input unit 1. As a result, a recognized code and similarity between the recognized code and the input data, i.e., the reliability of the recognition result are obtained. As mentioned above, the similarity data is represented by percentage where "100" means complete match, and "0" means the opposite. In this example, in steps S5 and S7, it is determined that the values of flags fg(1) and fg(2) are "1", and character recognition and gesture recognition are respectively performed in steps S6 and S8. Then, values indicating the recognition results are respectively set as a recognized character code1, its similarity r1, a recognized gesture code code2, and its similarity r2. In this example, an alphabet letter "X", is set as the code 1, a deletion gesture code is set as the code 2, and "85" is set to the similarity r1, and "70" is set as the similarity r2. As the value of the flag fg(0) is "0", figure recognition is not performed, and a recognized figure code code0 and its similarity r0 have no value. Note that "0" of the similarity r0 means "no match".

Next, in step S9, the maximum value among the similarities r0 to r2 are stored as mr. In this example, as the similarity r1 (85) is the greatest value, the value 85 is stored as mr. In step S10 , whether or not the mr value is greater than a predetermined threshold value is determined. In this example, value "70" is set as a threshold value between relatively high values and relatively not-so high values. If the maximum similarity mr is equal to the threshold value or greater, i.e., recognized result has a predetermined or higher reliability, the process proceeds to step S11, while if not, it is determined that no code has been recognized, and the process ends. Note that if the similarity is equal to the predetermined value or greater, it is considered that the recognition has been successful.

In step S11, whether or not there is any similarity r closest to the maximum similarity mr is checked. In this example, the gesture similarity r2 is determined as the closest similarity. This determination is made based on existence/ absence of another similarity within a predetermined range. In this example, the predetermined range is "20". In this manner, if it is determined that there is another recognized code in another recognition mode, the process proceeds to step S12 in which a selection image is outputted, then, as the user selects one mode, the recognition result in the selected mode is stored in a recognized-code storage area rcode, and the process ends. If there is no other similarity in step S11, the process proceeds to step S13 and the code of the maximum similarity mr is stored into the recognized-code storage area rcode, and the process ends.

Next, the case in FIG. 2B will be described in accordance with step S3 and the subsequent steps.

In this example, character recognition and gesture recognition are performed (fg(1)=1 and fg(2)=1). Then, character recognition is performed and a character "X" is recognized. A character code "X" is stored as the recognized character code codel, and a similarity value "85" is set as the similarity r1 (step S6).

Also, gesture recognition is performed and a deletion command is recognized. A deletion command is stored as the recognized gesture code code2, and a similarity value "70" is set as the similarity r2 (step S8).

Next, the similarity value r1 (85) is set as the maximum similarity mr (step S9), and whether or not the maximum similarity mr value is 70 or greater (step S10). As mr=85>70, whether or not there is recognized result with a similarity of 65 ((mr−20)=(85−20) or greater is examined (step S11). Since the similarity value r2 of the gesture recognition result is 70 and satisfies the above condition, the selection image in FIG. 2B is displayed (step S12). The user selects the "character" selection button A2 if he/she user wants to input "X" as a character, while selects the "deletion command" selection button A1 if he/she wants to input "X" as a command. If the user wants to input "X" as strokes, he/she selects the "stroke" selection button C. Then, a selected code is stored in the area rcode as input data. Note that if the "stroke" button C is pressed, no code is inputted.

Thus, if the system cannot make clear determination among discriminate command recognition (gesture recognition), character recognition, figure recognition, or stroke input, a selection image is displayed so that the user can select recognition mode. Accordingly, in each recognition mode, it is not necessary to consider any possible recognition code in another recognition mode.

Note that the similarity in the present embodiment may be replaced with any value so far as it indicates reliability of recognition. Further, the range of the value may be arbitrarily set. Since the present embodiment needs only rough reliability judgment, the values used in steps S10 and S11 may be set corresponding to the level of reliability.

When a plurality of recognition processings other than the above processings are used, the similarities r, the recognized codes rcode, mode flags fg may be increased in accordance with recognition processings.

[Second Embodiment]

Figure 4:
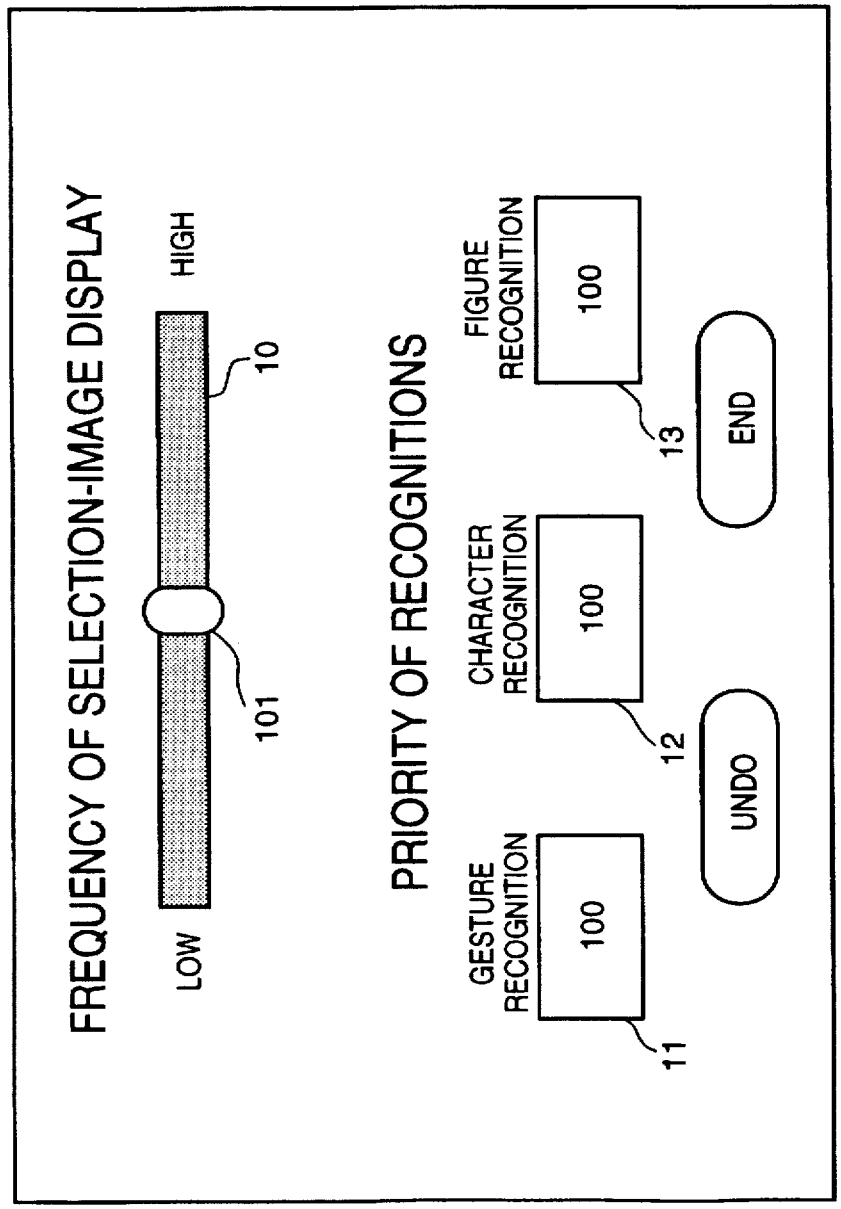
FIG. 4 is an example of a selection image for selecting recognition mode(s) according to a second embodiment of the present invention.
Figure 5:
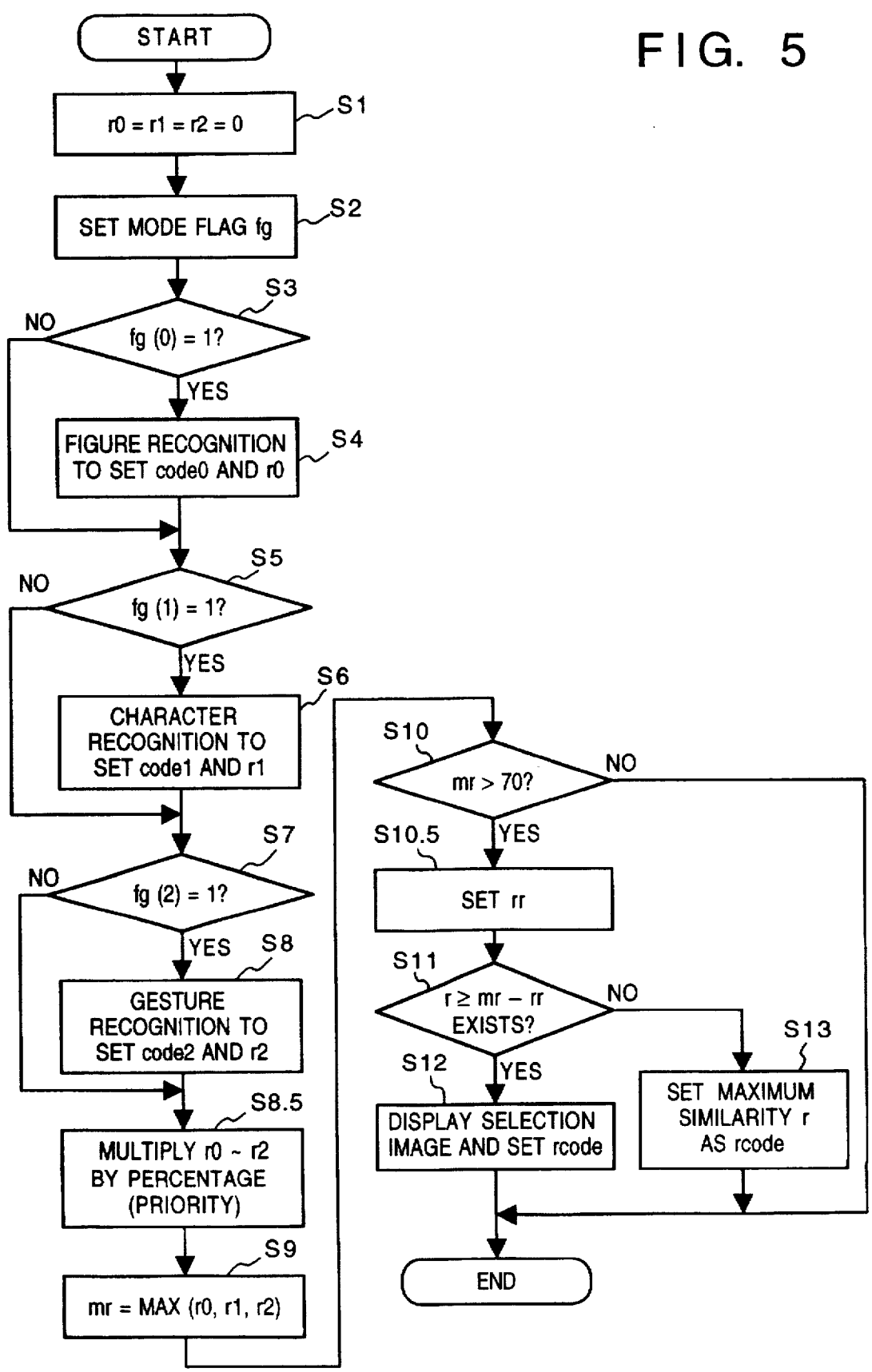
FIG. 5 is a flowchart showing the operation of the second embodiment.

FIG. 4 shows a selection image for setting the relation among a plurality of recognition processings, of the-data input apparatus 1001 according to a second embodiment of the present invention. This embodiment basically has the same construction as that of the first embodiment, except that the operation in the flowchart of FIG. 5 is different in some steps from that of FIG. 3. The difference from the first embodiment will be described with reference to FIGS. 4 and 5.

In FIG. 4, a slide is used for setting parameter of displaying a selection image. The parameter is a reference value for determining the similarity. When the slider 101 is moved leftward, a selection image is not displayed often even if a plurality of codes with in a plurality of recognition modes are picked up as very similar to each other. On the other hand, when the slider 10101 is moved rightward, a selection image is often displayed even if picked-up, codes are not so similar to each other. Thus, the range value (20 in step S11) for comparing the maximum similarity mr with its close value is changed by manipulating the parameter setting slide 10. In the first embodiment, this range value is fixed, however, in this embodiment, a value set by the slide 10 is stored into a storage area, and it is read out of the storage area at each processing. For example, assuming that the value of the left end position of the slide 10 is "0" and that of the right end position is "40", a value between these set values is linearl y set depending upon the position of the slider 101 and stored in-a storage area rr. In step S11' in FIG. 5, the value is read out of the storage area rr, and whether or not a value (mr-rr) exists is examined. In this manner, the user can arbitrarily change the parameter for selection-image displaying.

In FIG. 4, numerals 11 to 13 denote areas for setting priority of respective recognition modes. The priorities are determined by respectively inputting numerals corresponding to the areas. For example, if the areas 11 to 13 all have a value "100", gesture recognition, character recognition and figure recognition all have the same priority. When the areas 11 to 13 have values "100", "70" and "70" respectively, gesture recognition has a higher priority than other recognition modes. The input values are percentage values to be used in multiplication of the recognition similarities. Actually, in step S8.5, the respective recognition similarities are multiplied by the set percentages. In a case where the percentages are 100: 70: 70, the recognition similarities r are, r0 =r0 * 0.7, r1 =r1 * 0.7, r2=r2 * 1.0; i.e., the similarities of figure recognition and character recognition are lowered, and as a result, an input locus is likely to be recognized as a gesture command. Note that, if there are codes very similar to each other, a selection image is outputted for the user to select a recognition mode, similar to the processing in FIG. 3. In FIG. 4, input of percentage values are made before locus input.

FIG. 5 shows the operation as described above in detail. The processing in FIG. 5 is basically the same as that in FIG. 3 except additional steps S8.5, S10.5 and modified step S11'. In step S8.5, to control the priorities of recognitions, the respective similarities are multiplied with input percentage values. In step S10.5, to control selection-image display frequency, a set value is read out of the storage area rr. In step S11', a similarity range mr-rr is used.

This processing allows the user to select one of command recognition (gesture recognition), character recognition, figure recognition and stroke input, if the system cannot clearly discriminate available recognition mode(s) with respect to an input locus. Accordingly, in each recognition processing, it is not necessary to consider other possible recognized shapes in other recognition process. In addition, in this embodiment, the user can arbitrarily set the selection-image display parameter and the priorities of a plurality of recognition modes.

[Third Embodiment]

Figure 6:
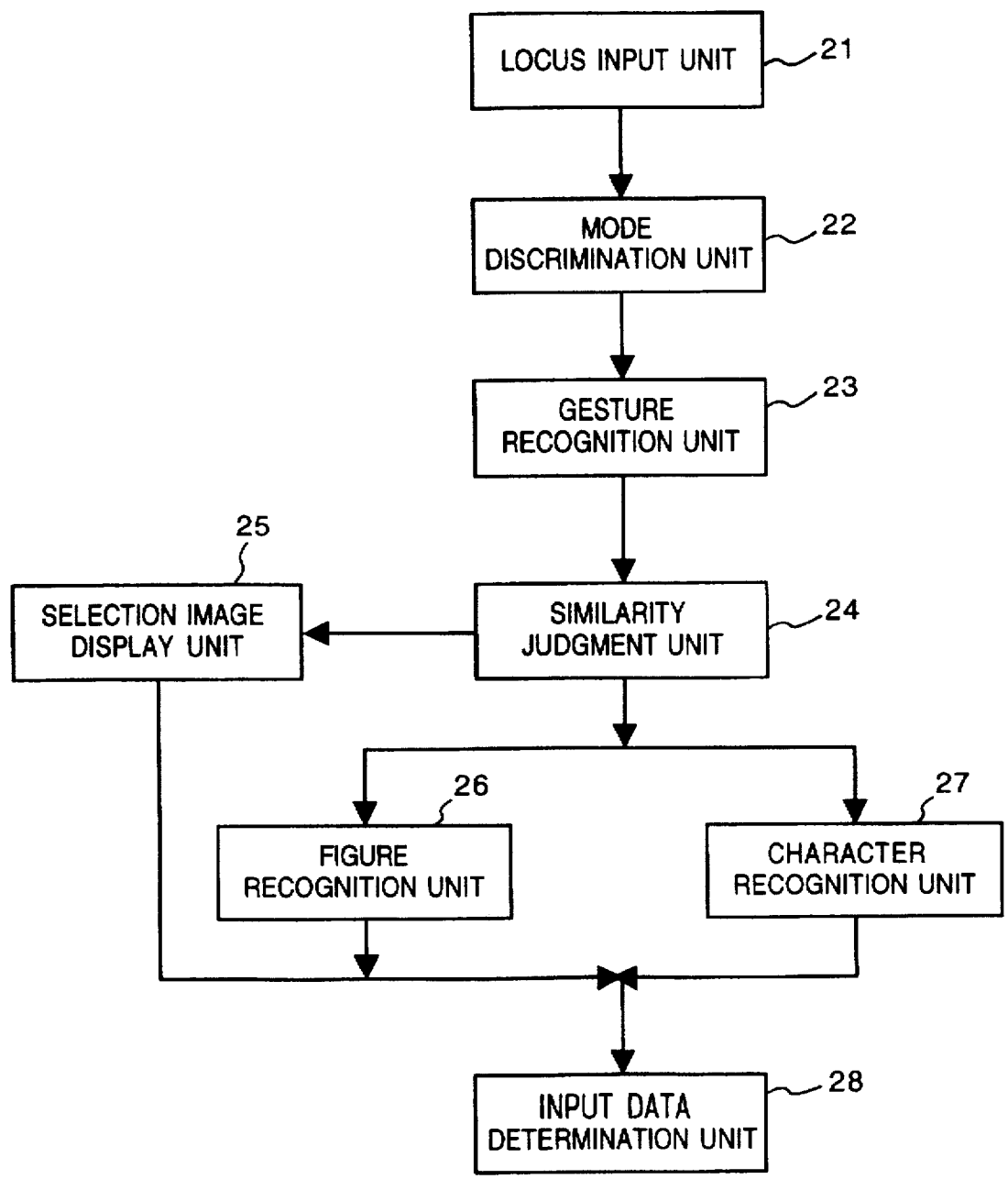
FIG. 6 is a block diagram showing the construction of the input apparatus according to a third embodiment of the present invention.

FIG. 6 shows the construction of the data input apparatus 1001 according to a third embodiment of the present invention.

In FIG. 6, the respective blocks look similar to those in FIG. 1, however, the construction is different from that of FIG. 1. This embodiment performs gesture recognition for all locus inputs, further avoids confusion of gesture recognition.

In FIG. 6, a locus input unit 21 corresponds to the locus input 1 in FIG. 1; a mode discrimination unit 22, to the mode discrimination unit 2; a gesture recognition unit 23, to the gesture recognition unit 5, a selection image display unit , to the selection image display unit 7; a figure recognition unit 26, to the figure recognition unit 3; and a character recognition unit 27, to the character recognition unit 4. Note that the similarity judgment unit 24 is different from the similarity judgment unit 6 in operation.

Figure 7:
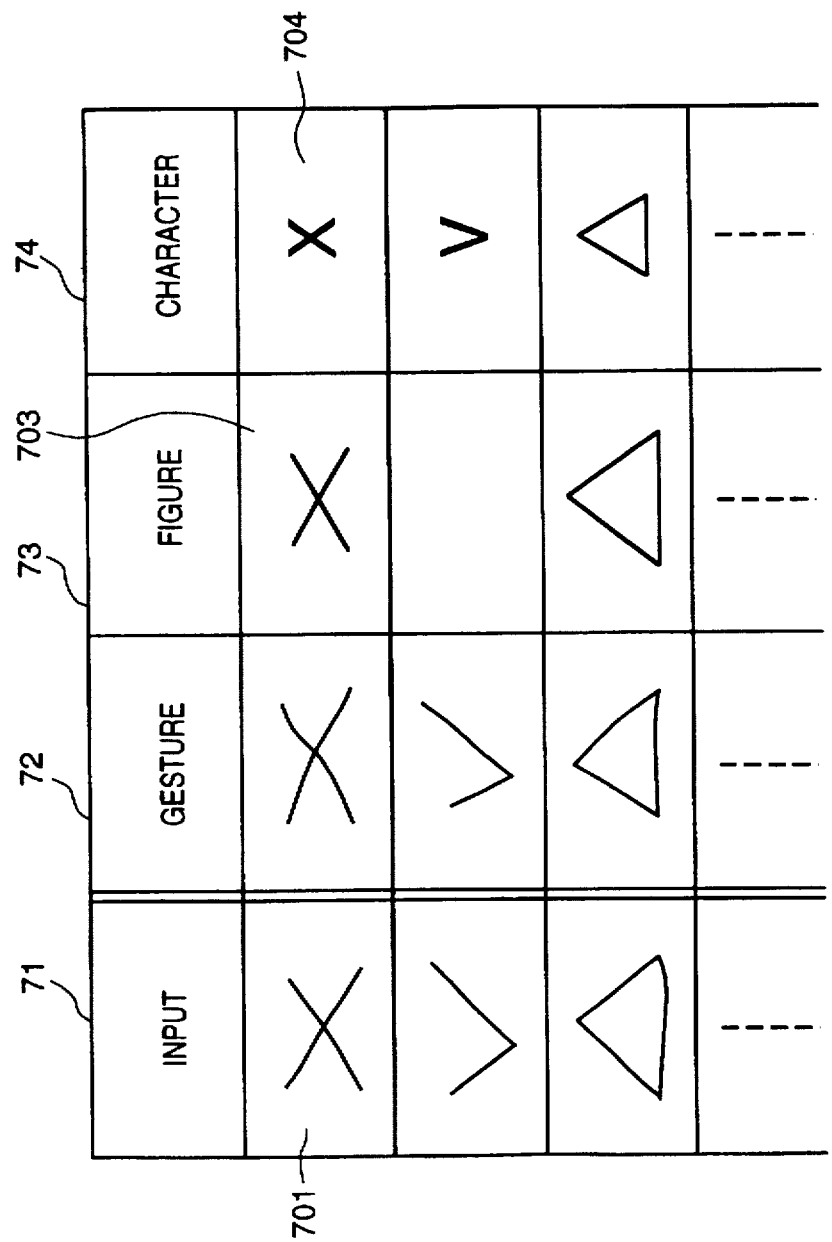
FIG. 7 is an example of a similarity table in the third embodiment.

FIG. 7 shows a similarity table used by the similarity judgment unit 24. The similarity table is included in the similarity judgment unit 24. In FIG. 7, a column 71 contains input loci; column 72, gesture codes; column 73, figure codes for discriminating figure type; and column 74, character codes. For simplicity of explanation, FIG. 7 conceptually illustrates the table with shapes instead of actual codes. Note that the input-locus column 71 does not exist in an actual similarity table. FIG. 7 shows the column 71 merely to show the corresponding codes for each input.

Figure 8:
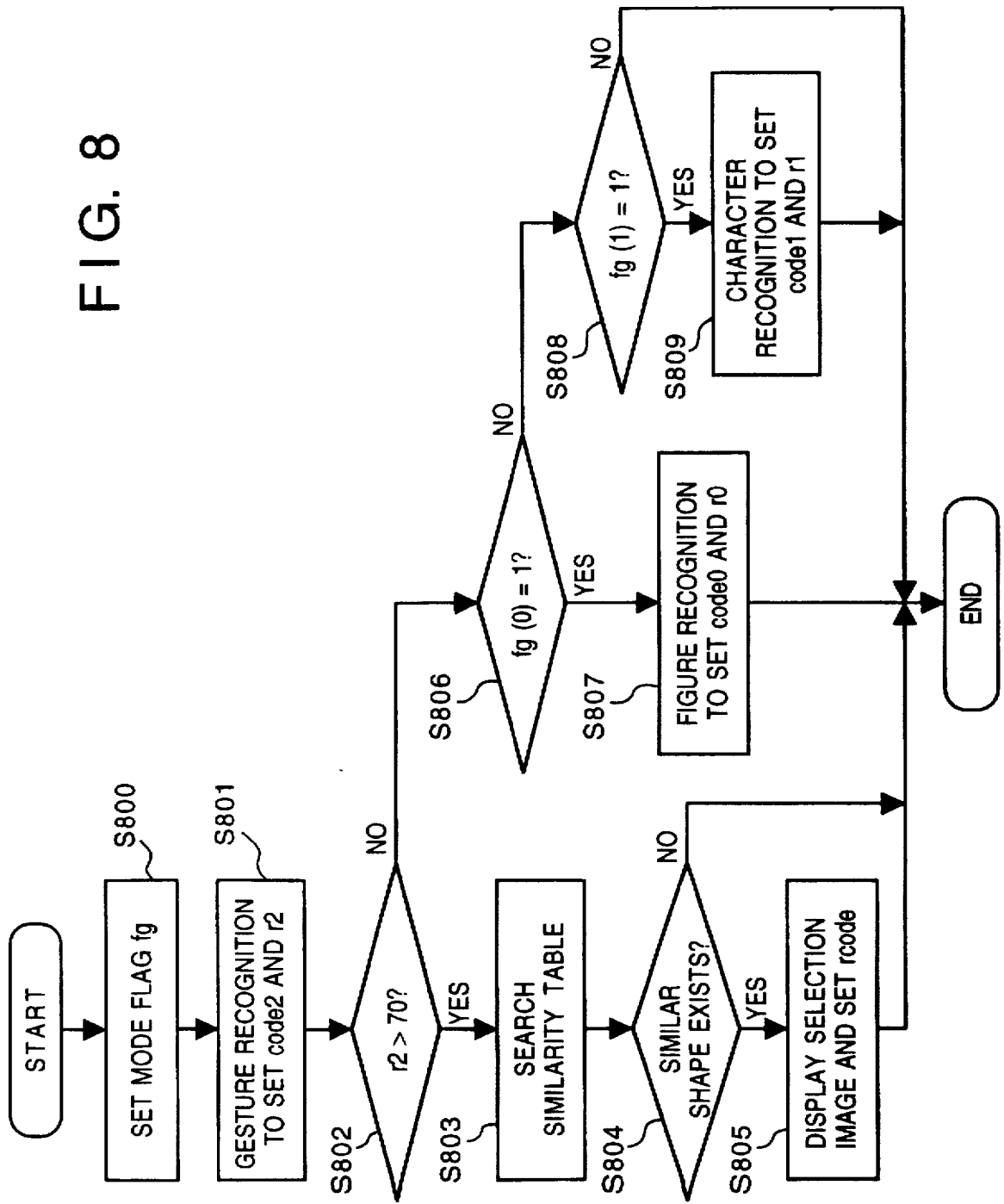
FIG. 8 is a flowchart showing the operation of the third embodiment.

FIG. 8 shows the processing procedure according to the third embodiment, i.e., processings by the gesture recognition unit 23 to the character recognition unit 27, to obtain a recognition result. The processing in FIG. 8 is realized by executing a program by the CPU 902 in FIG. 9. The operation of the third embodiment will be described below with reference to the flowchart of FIG. 8.

In step S800, the mode flags fg(0) to fg(2) are set in a similar manner to that in step S2 of the first embodiment.

In step S801, the gesture recognition unit 23 is activated, and a gesture code code2 and its similarity r2 are set as the recognition results. Next, the process proceeds to steps S802 and S803 for similarity judgment. In step S802, the similarity is checked. If the similarity r2 which is the reliability of the gesture recognition result is over a set threshold "70", i.e., the reliability is high, the process proceeds to step S803 in which the similarity table as shown in FIG. 7 is searched. This search is made by examining whether or not a gesture code in column 72 coincides with the code2. For example, when a locus 701 is inputted and a code 702 is recognized as the recognition result, it is determined that a figure code 703 and a character code 704 correspond to the input locus 701. Then, these codes 703 and 704 are set as code0 and code1, and the process proceeds to step S804, in which the result of the table search, i.e., whether similar codes are retrieved or not is determined. If YES, the process proceeds to step S805 in which a selection image is outputted, so that the user selects a desired recognition mode. The code of the selected mode is determined as the final recognized code, and the process ends. The selection image may be as shown in FIGS. 2A and 2B.

If it is determined in step S802 that the recognition reliability is not high, the process proceeds to steps S806 and S808, in which the mode flags fg(0) and fg(1) are checked, and figure recognition in step S807 or character recognition in step S808 is activated. Then, the recognized code is determined as the final recognition result, and the process ends.

Thus, one shape can be commonly used in a plurality of recognition processings such as character recognition, command recognition and gesture recognition. Although the present embodiment uses only one recognition processing, i.e., the gesture recognition, the present embodiment enables higher processing than the processing in the first embodiment, since the first embodiment activates all the recognition modest while this embodiment perform recognition processing on one symbol-structure data by one recognition mode. Further, the combination of the third embodiment with the first embodiment or the second embodiment will attain concurrent use of plurality of recognition processing with high speed.

[Fourth Embodiment]

Next, the data input apparatus 1001 according to a fourth embodiment, in which a plurality of recognition modes can be used, will be described. The input apparatus has the same construction as that of the third embodiment shown in FIG. 6, and has a similarity table as shown in FIG. 7. The difference from the third embodiment is the processing procedure shown in FIG. 11. The processing procedure according to the fourth embodiment will be described with reference to FIG. 11.

Figure 11:
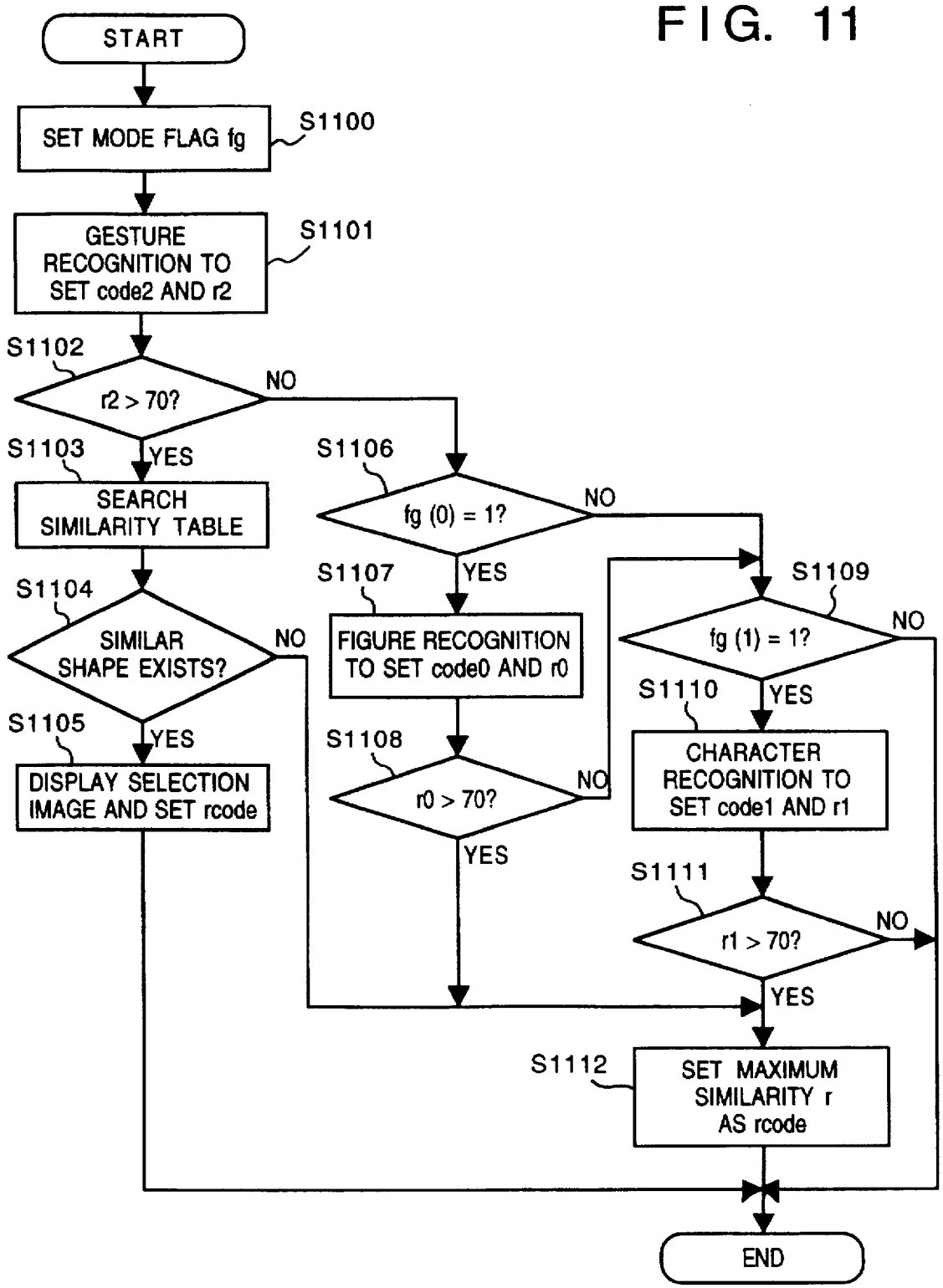
FIG. 11 is a flowchart showing the operation of a fourth embodiment of the present invention.

In FIG. 11, the process starts when a set of symbol data is inputted. In step S1100, the mode flags fg(0) to fg(2) are set in a similar manner to that in step S2 of the first embodiment. In step S1101, gesture recognition is performed, and the obtained code and its similarity are set as the recognized gesture code2 and the similarity r2. In step S1102, the similarity value is examined whether it equal to a set threshold "70" or greater. If it is "70" or greater, the similarity table is searched in step S1103. The retrieved code is examined in step S1104, and if another code with high similarity exists, these codes are displayed in the form as shown in FIG. 2A or 2B for the user's selection. Then, the determined code is set as the final recognition result rcode. If there is no other code, the gesture code code2 is determined as the final recognition result.

On the other hand, if the similarity r2 is less than the threshold "70", whether or not figure recognition mode is set is examined in step S1106. If YES, figure recognition is performed in step S1107, and the obtained code and its similarity are set as the recognized figure code code0 and the similarity r0. Next, the similarity r0 is examined in step S1108, and if it is "70" or greater, the figure code0 is determined as the final recognition result.

If gesture recognition and figure recognition have not obtained a final recognition result, whether or not character recognition is set is examined in step S1109. If YES, character recognition is performed in step S1110, and the obtained code and its similarity are set as the recognized character code code1 and the similarity r1. If the similarity r1 is "70" or greater, the code 1 is determined as the final recognition result.

If the similarity r1 is less than "70", it is determined that there is no code corresponding to the input symbol-structure data, and the process ends.

In this processing, if a gesture code is recognized, the table is searched for code of similar shape, thus attaining high-speed processing. If a recognition result having a similarity "70" or greater is not found, the processing moves from the current mode to another recognition mode, thus performs gesture recognition, figure recognition and character recognition, with respect to one input.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to appraise the public of the scope of the present invention, the following claims are made.

What is claimed is:

1. An image recognition apparatus for recognizing an input locus, comprising:

locus input means for inputting a locus;

recognition means for recognizing an input image constituted by the locus inputted by said locus input means in a plurality of recognition modes and for obtaining first candidates of a recognition result in each of the plurality of recognition modes as a plurality of functions;

determination means for determining similarities of the first candidates so as to obtain second candidates of a recognition result, the second candidates having similar shapes to one another; and selection means for selecting one of the second candidates from the plurality of functions as the recognition result.

2. The image recognition apparatus according to claim 1, wherein said recognition means has a plurality of recognition modes corresponding to types of an input image and performs recognition in each mode, and wherein said determination means obtains the second candidates by determining similarities in different modes of the plurality of recognition modes so that second candidates having different functions from one another are obtained.

3. The image recognition apparatus according to claim 2, wherein the plurality of recognition modes include a character recognition mode for recognizing an input image as a character and a command recognition mode for recognizing an input image as a command to edit characters of an input image.

4. The image recognition apparatus according to claim 3, further comprising memory means for storing correspondence among the plurality of functions, wherein said recognition means first performs recognition in the command recognition mode, and if the recognition is successful, said selection means refers to the correspondence in said memory means to select one shape.

5. The image recognition apparatus according to claim 2, further comprising priority input means for inputting priorities of the respective recognition modes, wherein said determination means obtains the second candidates by using the priorities.

6. The image recognition apparatus according to claim 2, wherein said recognition means adds a predetermined order to the respective recognition modes, and if recognition in one mode is unsuccessful, performs recognition in another recognition mode, in accordance with the order.

7. The image recognition apparatus according to claim 6, further comprising memory means for storing correspondence among a plurality of functions recognized in the respective recognition modes, wherein said recognition means first performs the recognition in the input image in a command recognition mode, and if the recognition is successful, said determination means refers to the correspondence in said memory means to obtain the second candidates.

8. The image recognition apparatus according to claim 6, wherein if the recognition of input image is successful in one recognition mode, said selection means selects a recognized shape from the recognition as a recognition result.

9. The image recognition apparatus according to claim 2, further comprising display means for displaying an image, wherein said display means displays the second candidates for selection of one of the second candidates.

10. The image recognition apparatus according to claim 9, further comprising reference input means for inputting a reference value of similarity, wherein selection means displays the functions in accordance with the reference value.

11. The image recognition apparatus according to claim 1, wherein said recognition means obtains similarities between the input image and shapes corresponding to the recognized candidates, and wherein said selection means selects one of the candidates based on the similarities.

12. The image recognition apparatus according to claim 11, wherein if a difference between similarities between the input image and shapes corresponding to the first candidates is less than a predetermined value, said selection means displays the shapes for selection of one shape.

13. The image recognition apparatus according to claim 12, further comprising input means for inputting the predetermined value.

14. The image recognition apparatus according to claim 11, further comprising priority input means for inputting priorities, wherein said determination means performs weighting on the similarities in accordance with the priorities.

15. An image recognition apparatus comprising:
   locus input means for inputting a locus;
   recognition means for recognizing an input image constituted by the locus inputted by said locus input means in a plurality of recognition modes and for obtaining first candidates of a recognition result in each of the plurality of recognition modes;
   judgment means for judging similarities in shapes among the first candidates obtained in a plurality of recognition modes
   display means for displaying, as second candidates, the shapes of the first candidates which are judged as having similar shares; and
   selection means for selecting one, as the recognition result, from the second candidates displayed by said display means, in accordance with designation of a user.

16. An image processing method for recognizing an input locus, comprising:
   a locus input step of inputting a locus;
   a recognition step of recognizing an input image as shapes having different function using a plurality of recognition modes, and of obtaining first candidates of a recognition result in each of the pluarity of recognition modes;
   a judgemnet step of judging similarities in the shapes of the first candidates obtained in the plurality of recognition modes in said recognition step;
   a display step for displaying , as second candidates, the shape of the first candidates which are judged as having similar shapes; and
   a selection step of selecting one, as the recognition result, from the second candidates displayed by the display means, in accordance with designation of a user.

17. An image processing method according to claim 16, wherein in said recognition step, the plurality of recognition modes include a character recognition mode for recognizing an input image as a character and a command recognition mode for recognizing an input image as a command to edit input characters.

18. The image processing method according to claim 16, wherein said recognition step includes a step of judging whether or not recognition is successful.

19. The image processing method according to claim 16, wherein in said recognition step, similarities between an input image and the candidate shapes are obtained.

20. The image processing method according to claim 16, further comprising a step of inputting priorities, wherein in said judgment step, the similarities are judged using the input priorities.

21. A data input apparatus for encoding an input locus and inputting code data, comprising:
   recognition means for recognizing an image by (1) a locus, (2) recognizing an input image as shares having different functions using a plurality of recognition modes, (3) obtaining first candidates of a recognition result in each of the plurality of recognition modes, (4) judging similarities in the shaves of the first candidates obtained in the plurality of recognition modes, (5) displaying, as second candidates, the shape of the first candidates which are judging as having similar shares, and (6) selecting one, as the recognition result, from the second candidates displayed by the display means, in accordance with designation of a user; and
   input means for inputting a code corresponding to a shape obtained as a recognition result from recognition by said recognition means.

22. An image recognition method for recognizing an input locus, comprising steps of:
   inputting a locus;
   recognizing an input image constituted by the input locus in a plurality of recognition modes and obtaining first candidates of a recognition result in each of the plurality of recognition modes as a plurality of functions;
   determining similarities of the first candidates so as to obtain second candidates of a recognition result, the second candidates having similar shapes to one another; and
   selecting one from the second candidates from the plurality of functions as the recognition result.

23. A method according to claim 22, wherein an input image is recognized in a plurality of recognition modes corresponding to types of an input image, and wherein the second candidates are obtained by determining similarities in different modes of the plurality of recognition modes so that second candidates having different functions from one another are obtained.

24. A method according to claim 23, wherein the plurality of recognition modes include a character recognition mode for recognizing an input image as a character and a command recognition mode for recognizing an input image as a command to edit characters of an input image.

25. A method according to claim 24, further comprising the step of storing similarities of the first candidates, wherein recognition is performed in the command recognition mode first, and if the recognition is successful, a corresponding similarity is referred to in said selecting step.

26. A method according to claim 23, further comprising a priority inputting step of inputting priorities of the respective recognition modes, wherein the second candidates are obtained in said determining step by using the priorities.

27. A method according to claim 23, wherein a predetermined order is added to the respective recognition modes in said recognizing step, and if recognition in one mode is unsuccessful, recognition in another recognition mode is performed, in accordance with the order.

28. A method according to claim 27, further comprising the step of storing similarities of the first candidates, wherein recognition is performed in the command recognition mode first, and if the recognition is successful, a corresponding similarity is referred to in said selecting step.

29. A method according to claim 27, wherein if the recognition of the input image is successful in one recognition mode, a recognized shape is selected from the recognition as a recognition result.

30. A method according to claim 23, further comprising a displaying step of displaying an image, wherein the first candidates which are recognized in the respective modes and have their similarities determined in said determination step are displayed in said selecting step for selection of one shape.

31. A method according to claim 30, further comprising reference inputting step of inputting a reference value of similarity, wherein the second candidates are displayed in accordance with the reference value in the selecting step.

32. A method according to claim 22, wherein similarities between the input image and the first candidates are obtained in said recognizing step, and wherein a function based on one of the similarities is selected in said selecting step.

33. A method according to claim 32, wherein if the difference between similarities of the first candidates is less than a predetermined value, the first candidates are displayed for selection in said selection step.

34. A method according to claim 33, further comprising an inputting step of inputting the predetermined value.

35. A method according to claim 32, further comprising a priority inputting step of inputting priorities, wherein weighting on the similarities is performed in accordance with the priorities, in said determining step.

36. A computer-readable storage medium on which a program is encoded, the program comprising:

locus input code to input a locus;

recognition code to recognize an input image constituted by the locus in a plurality of recognition modes and to obtain first candidates of a recognition result in each of the plurality of recognition modes as a plurality of functions;

determination code to determine similarities of the first candidates so as to obtain second candidates of a recognition result, the second candidates having similar shapes to one another; and selection code to select one of the second candidates from the plurality of functions as the recognition result.

37. A medium according to claim 36, wherein the input image is recognized using a plurality of recognition modes corresponding to types of an input image and wherein the second candidates are obtained by determining similarities in different modes of the plurality of recognition modes so that second candidates having different functions from one another are obtained.

38. A medium according to claim 37, wherein the plurality of recognition modes include a character recognition mode for recognizing an input image as a character and a command recognition mode for recognizing an input image as a command to edit characters of an input image.

39. A medium according to claim 38, wherein the program further comprises code to store similarities of the first candidates, wherein recognition is first performed in the command recognition mode, and if the recognition is successful, a corresponding similarity is referred to during selection of one of the second candidates.

40. A medium according to claim 37, wherein the program further comprises priority input code to input priorities of the respective recognition modes, wherein the second candidates are obtained by using the priorities.

41. A medium according to claim 37, wherein during execution of said recognition code, a predetermined order is added to the respective recognition modes, and if recognition in one mode is unsuccessful, recognition is performed in another recognition mode, in accordance with the order.

42. A medium according to claim 37, wherein the program further comprises storing code to store similarities of the first candidates, wherein recognition is first performed in the command recognition mode, and if the recognition is successful, a corresponding similarity is referred to in order to obtain the second candidates.

43. A medium according to claim 41, wherein if the recognition of input image is successful in one recognition mode, a recognized shape from the recognition is selected as a recognition result.

44. A medium according to claim 37, wherein the program comprises display code to display an image, wherein the first candidates which are recognized in the respective modes and have their similarities determined are displayed, for selection of one shape.

45. A medium according to claim 44, wherein the program further comprises reference input code to input a reference value of similarity, wherein the second candidates are displayed in accordance with the reference value.

46. A medium according to claim 36, wherein similarities between the input image and the first candidates are obtained and wherein a function based on one of the similarities is selected.

47. A medium according to claim 46, wherein if the difference between similarities of the first candidates is less than a predetermined value, the first candidates are displayed for selection of one shape.

48. A medium according to claim 47, wherein the program further comprises input code to input the predetermined value.

49. A medium according to claim 48, wherein the program further comprises priority input code to input priorities, wherein weighting is performed on the similarities in accordance with the priorities.

50. A computer-readable storage medium on which a program a is encoded, the program comprising:

locus input code to input a locus;

recognition code to recognize an input image constituted by the locus in a plurality of recognition modes and to obtain first candidates of a recognition result in each of the plurality of recognition modes;

judgment code to judge similarities in shapes among the first candidates obtained in the plurality of recognition modes;

display code to display, as second candidates, the shapes of the first candidates which are judged as having similar shapes; and selection code to select one, as the recognition result, from the displayed second candidates, in accordance with a designation by a user.

* * * * *

UNITED STATES PATENT AND TRADEMARK OFFICE
CERTIFICATE OF CORRECTION

PATENT NO. : 5,781,663

DATED : July 14, 1998

INVENTORS : Katsuhiko Sakaguchi, et al.  Page 1 of 3

It is certified that error appears in the above-identified patent and that said Letters Patent is hereby corrected as shown below:

COLUMN 2

Line 25, "of." should read --of--.

COLUMN 3

Line 25, "FIG." should read --FIG. 10--;
  Line 27, "FIG.," should read --FIG. 10,--; and
  Line 28, "02" should read --1002--.

COLUMN 5

Line 52, "S11," should read --S11;--.

COLUMN 6

Line 21, "-20)" should read -- -20))--;
  Line 52, "the-data" should read --the data--; and
  Line 67, "10101" should read --101--.

COLUMN 7

Line 1, "picked-up," should read --picked-up--;
  Line 11, "linearl y" should read --linearly--;
  Line 12, "in-a" should read --in a--;
  Line 33, "that ." should read --that--.

UNITED STATES PATENT AND TRADEMARK OFFICE
CERTIFICATE OF CORRECTION

PATENT NO. : 5,781,663

DATED : July 14, 1998

INVENTORS : Katsuhiko Sakaguchi, et al.

Page 2 of 3

It is certified that error appears in the above-identified patent and that said Letters Patent is hereby corrected as shown below:

COLUMN 8

Line 2, "unit, to" should read --unit 25, to--;
  Line 64, "modest" should read --modes,-- and
  "perform" should read --performs--; and

COLUMN 9

Line 34, "r0 ." should read --r0.--; and
  Line 43, "r1 ." should read --r1.--.

COLUMN 11

Line 28, "modes" should read --modes;--;
  Line 31, "shares;" should read --shapes;--;
  Line 40, "function" should read --functions--;
  Line 42, "pluarity" should read --plurality--;
  Line 47, "displayiug," should read --displaying--; and
  Line 48, "shape" should read --shapes--.

COLUMN 12

Line 5, "(1)a" should read --(1) inputting a--;
  Line 11 "shape" should read --shapes--; and
  Line 12, "shares," should read --shapes,--.

UNITED STATES PATENT AND TRADEMARK OFFICE
CERTIFICATE OF CORRECTION

PATENT NO. : 5,781,663

DATED : July 14, 1998

INVENTORS : Katsuhiko Sakaguchi, et al.

It is certified that error appears in the above-identified patent and that said Letters Patent is hereby corrected as shown below:

COLUMN 14

Line 42, "a is" should read --is--.

Signed and Sealed this

Thirtieth Day of March, 1999

Attest:

Q. TODD DICKINSON

*Attesting Officer*    Acting Commissioner of Patents and Trademarks